(12) United States Patent
Deshpande et al.

(10) Patent No.: US 11,113,273 B2
(45) Date of Patent: Sep. 7, 2021

(54) MANAGED MATERIALIZED VIEWS CREATED FROM HETEROGENEOUS DATA SOURCES

(71) Applicant: Amazon Technologies, Inc., Seattle, WA (US)

(72) Inventors: Rohan Deshpande, Seattle, WA (US); Yannis Papakonstantinou, Lo Jolla, CA (US); Omer Ahmed Zaki, Bellevue, WA (US); Karthik Gurumoorthy Subramanya Bharathy, Sammamish, WA (US); Rajib Dugar, Bellevue, WA (US); Shivateja Reddy Ummenthala, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 16/699,486

(22) Filed: Nov. 29, 2019

(65) Prior Publication Data

US 2021/0165782 A1 Jun. 3, 2021

(51) Int. Cl.
*G06F 16/23* (2019.01)
*G06F 16/21* (2019.01)
*G06F 16/242* (2019.01)

(52) U.S. Cl.
CPC ........ *G06F 16/2393* (2019.01); *G06F 16/219* (2019.01); *G06F 16/2445* (2019.01)

(58) Field of Classification Search
CPC ................................................. G06F 16/2393
See application file for complete search history.

(56) References Cited

U.S. PATENT DOCUMENTS

| | | | |
|---|---|---|---|
| 5,535,385 A * | 7/1996 | Griffin | G06F 16/2365 |
| 6,205,451 B1 * | 3/2001 | Norcott | G06F 16/24539 |
| 6,882,993 B1 * | 4/2005 | Lawande | G06F 16/2393 707/714 |
| 6,889,231 B1 | 5/2005 | Souder et al. | |
| 2017/0092060 A1 * | 3/2017 | Toohey | G06F 16/254 |
| 2019/0332698 A1 | 10/2019 | Cho et al. | |
| 2020/0334254 A1 | 10/2020 | Arye et al. | |
| 2020/0379993 A1 | 12/2020 | Rajaperumal et al. | |

OTHER PUBLICATIONS

International Search Report and Written Opinion from PCT/US2020/062265, dated Feb. 10, 2021, pp. 1-14.
Johnson, Theodore, et al., "Update Propagation in a Streaming Warehouse," In International Conference on Scientific and Statistical Database Management 2011, Lecture Notes in Computer Science, vol. 6809, Jul. 20, 2011, pp. 129-149, Springer, Berlin, Heidelberg.

* cited by examiner

*Primary Examiner* — William Spieler
(74) *Attorney, Agent, or Firm* — Robert C. Kowert; Kowert, Hood, Munyon, Rankin & Goetzel, P.C.

(57) ABSTRACT

Managed materialized views may be generated from across heterogeneous data sources. A request to create a materialized view may be received and performed by a materialized view management platform, which may obtain and generate the materialized view from different data sources and store the materialized view in a target system. Changes to the data sources may be obtained at the materialized view management platform and updates to the materialized view may be determined. The materialized view in the target system may be updated.

20 Claims, 12 Drawing Sheets

MANAGED MATERIALIZED VIEWS CREATED FROM HETEROGENEOUS DATA SOURCES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost of maintaining the information. Moreover, as different data storage technologies offer different performance benefits and features, tailoring the location of data to a data storage technology that provides performance and analysis benefits for that data may result in different data sets being spread across many different locations and types of storage systems. While utilizing such a deployment strategy for individual data sets offers some benefit to the individual data sets, some systems or applications may need access to multiple different data sets in order to operate, which can be challenging given the various interfaces, languages, and other technological hurdles that occur when accessing multiple data storage systems. Thus, techniques that can obtain and co-locate data from disparate data storage systems for systems or applications that use data from the disparate storage systems, without removing the data from their optimized source storage locations, may be highly desirable.

Figure 1:
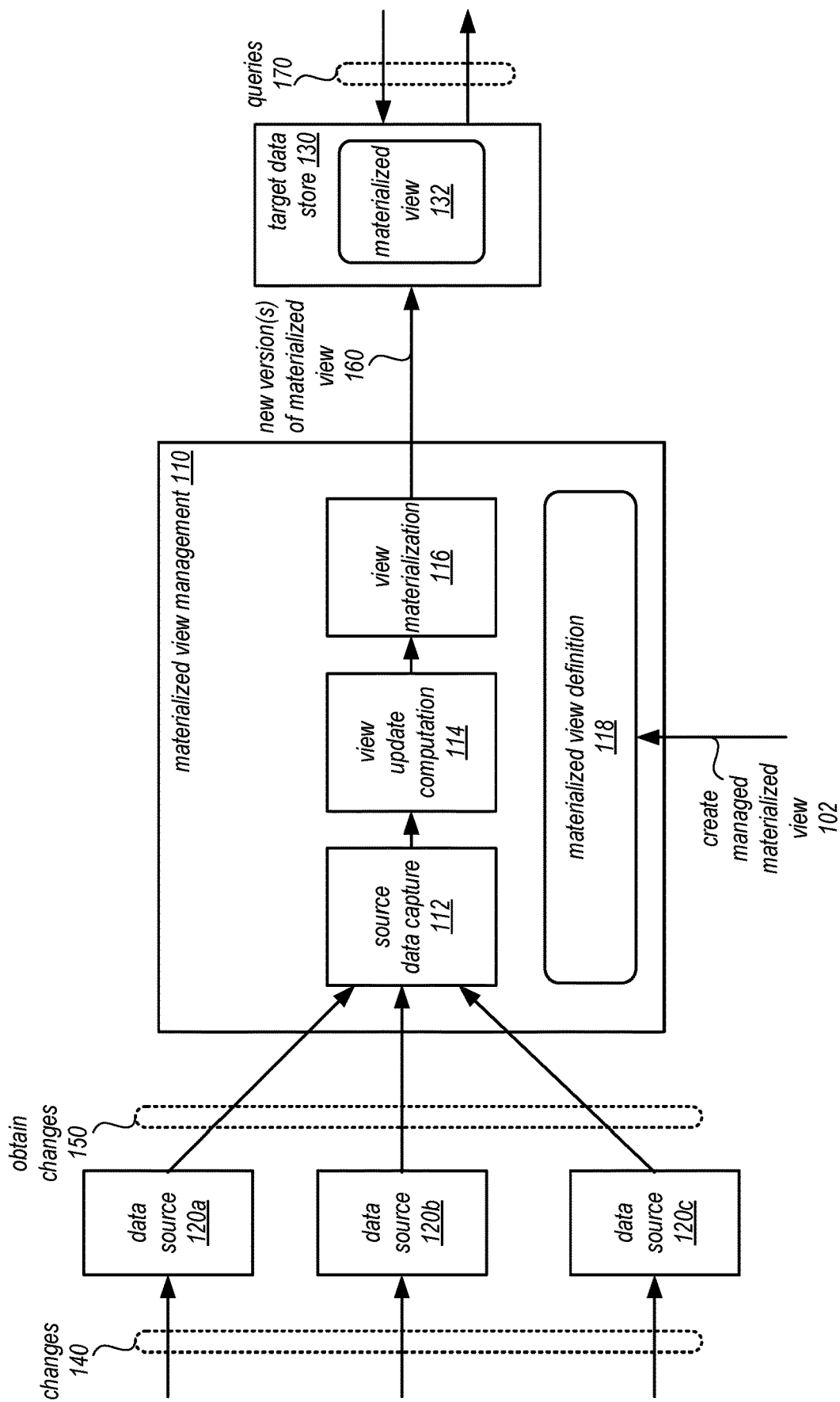
FIG. 1 illustrates a logical block diagram illustrating managed materialized views created from heterogeneous data sources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of managed materialized views created from heterogeneous data sources are described herein. Different systems, applications, or services store data in multiple purpose-built databases or other data storage or processing technologies to ensure they use the right tool for the job at hand. However, there are many use cases that combine data from multiple such databases, data stores, or other types of data sources. For example, an application implementing an online multi-player game may need to track player profile data, player behavior, and offer in-game promotions. The application might keep player profile data in a low-latency non-relational (e.g., NoSQL) database, game events in an indexing service, player behavior analytics in a data warehouse service, and promotion catalog in a document database. To build a dashboard of top players and their game activities, an Extract Transform and Load (TEL) service could be used to set up pipelines that extract, transform, and combine data from these disparate systems into a single data store, such as a data caching service, in order to host the dashboard and do activities such as in-game promotion targeting. While such an approach may work for batch updates, keeping the dashboard updated in near real-time would have to rely upon writing significant custom code. The costs to create the custom code for complex integration and pre-computation workflows may increase as fast changing underlying data sources would cause further refinements or changes. Use cases and patterns like the example above exist in virtually every industry, decreasing system performance and increasing implementation costs.

In various embodiments, a materialized view management platform may simplify operational workloads by making it easy to create materialized views that integrate data from multiple sources, storing these views in a specified target database, and keeping the views up-to-date in near real-time as the underlying data changes (instead of, for instance, relying upon making batch-based sets of changes). As discussed in detail below with regard to FIGS. 2-7, a materialized view management platform can offer a serverless experience for client applications while also offering for high performance. For example, in various embodiments, the materialized view management platform can scale automatically to ingest large volumes of source data changes and to perform computations to construct the views. Because the materialized view management platform may be serverless, in some embodiments, a client application (or developers for the client application) will not have to setup infrastructure, provision capacity or configure read and write limits. The materialized view management platform may instead receive a materialized view definition that specifies data sources, the integration of data from the different data sources and a target (or multiple targets) to store the materialized views.

FIG. 1 illustrates a logical block diagram illustrating managed materialized views created from heterogeneous data sources, according to some embodiments. Materialized view management 110, may be a materialized view manage platform 210 as discussed below with regard to FIGS. 2-7 implemented as part of a provider network or implemented as part of a private or on-premise network. Materialized view management 110 may create materialized views, such as materialized view 132, from different numbers and types of data sources, performing source data capture 112, initial and update view computation 114, and view materialization 116 to store a materialized view 132 (as well as updated or new versions 160 in a target data store 130. Materialized views created and updated (or maintained) by materialized view management 110, such as materialized view 132, may be a continuously updated result set of an analysis over data sources that are specified in a materialized view definition to materialized view management 110. For example, a request to create a managed materialized view 102 may be sent to materialized view management 110 that provides materialized view definition 118 for materialized view 132.

Materialized view management 110 can offer various properties or guarantees to a consumer of a materialized view, in some embodiments. For example, a publisher of a materialized view can constrain the data by defining schemas and typing in a creation request and/or materialized view definition 118. For example, the definitions may allow semi-structured data, i.e., data where there are significant degrees of freedom on the types. For example, the publisher specify features such as "the SSN attribute is either a string or a number" or that "the additional notes attribute allows for any type of (SQL) content", or "the dimensions (of a data source record) include an attribute sensor id and potentially other undeclared attributes." In some embodiments, materialized view management 110 can specify transactional consistency properties of the incoming data sources. For example, when capturing changes, materialized view management 110 can guarantee that the changes have no holes (missing changes). In some embodiments, the publisher may guarantee deduplication. In some embodiments, the publisher of the view may be able to guarantee order of arrivals or an approximation. These guarantees may be supported by various features of materialized view management 110 (as discussed in the various example embodiments below).

The materialized view can be accessed using the target data store, such as target data store 130 via queries 170. In this way, a desired type or style of data store, for example, for integrating the materialized can be specified. The interface supported by target data store 130 may be used to access the materialized view, in various embodiments. For example, a SQL query may be made to access materialized view 132 if target data store 130 is a relational database that supports SQL. If however target data store 132 were stored in a non-relational database, then a request according to the programming language or interface of the non-relational database may be used to access the materialized view instead. In this way, materialized views can be deployed to targets that support the desired features for analyzing and accessing the materialized view, in some embodiments.

A materialized view can be defined 118 in various ways. For example, in some embodiments a structured query language (SQL) statement can be used to specify the one or more data sources, such as data sources 120a, 120b, and 120c, and a target, such as target data store. In some embodiments, a user interface or other type of interface (e.g. an Application Programming Interface (API)) can be used to specify the materialized view, including the desired results (e.g., scan, get, join, aggregate, etc.), sources (e.g., by selecting data sources from a list of offered sources), and targets (e.g., by selecting target(s) from a list of offered targets). In some embodiments, target data store 130 can be one of the data sources (e.g., with the view stored in a different location, such as a different table in a same database).

Data sources 120 may be many different types of data storage, processing, and/or management technologies, in some embodiments. For example, data sources 120 may be various types of databases (including relational databases, non-relational databases, graph databases, document databases, time series databases, data warehouses, or various other types of databases). In another example, data sources 120 may include various data streaming platforms or services (e.g., data streams for data feeds, events, or other stream processing techniques). In some embodiments, data sources 120 may be messaging, notification, or other communication services or platforms. Various combinations of the different example data sources may be used or combined to create a materialized view (e.g., a materialized view that joins a database table with a data stream). Similarly target data store 130 can be various types of data storage, processing, and/or management technologies, such as the examples given above.

Once materialized view management 110 creates materialized view 132 in target data store 130, materialized view management 110 may also maintain materialized view 132 to provide near real-time updates. In this way, materialized view 132 may provide up-to-date changes when queries or analyzed. For example, as different changes 140 are made to (or by) data sources 120, these changes may be obtained 150 a materialized view 110. Source data capture 112 may be implemented at materialized view management 110 to handle the capture and ingestion of changes to data sources. For example, as discussed below with regard to FIG. 5, source data capture 112 may implement the protocols or techniques to receive or obtain the updates when they occur at data sources 120.

Materialized view management 110 may implement view update computation 114, in various embodiments. View update computation 114 may perform various queries or other operations to obtain data (in addition or based) the captured changes (e.g., query to obtain data to join with received changes). View update computation 114, which may implement the techniques or components discussed below with regard to FIGS. 6, 9 and 10, may perform a plan or procedure (e.g., generated by a federated query engine or other data processing engine) to provide a stream of changes and/or set of changes to view materialization 116. View materialization 116 (e.g., a target connector discussed below in regard to FIG. 7) may reformat, package, encapsulate, or otherwise translate the changes to the materialized view 138, and perform one or more requests to target data store 130 (e.g., via an interface for accessing target data store 130) to update materialized view 160 with a new version of the materialized view. For example, view materialization may collect or identify a set of changes as a new snapshot (e.g., a state of a materialized view as of a point in time) to update in target data store 130 as a new version of materialized view 132.

Please note that the previous description of materialized view management is a logical illustration and thus is not to be construed as limiting as to the implementation of data sources, targets, materialized views, or various other features. Different combinations or implementations may be implemented in various embodiments.

This specification begins with a general description of a provider network that implements a materialized view management platform. Then various examples of a materialized view management platform including different components/modules, or arrangements of components/module that may be employed as part of implementing the materialized view management platform are discussed. A number of different methods and techniques to implement managed materialized views created from heterogeneous data sources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
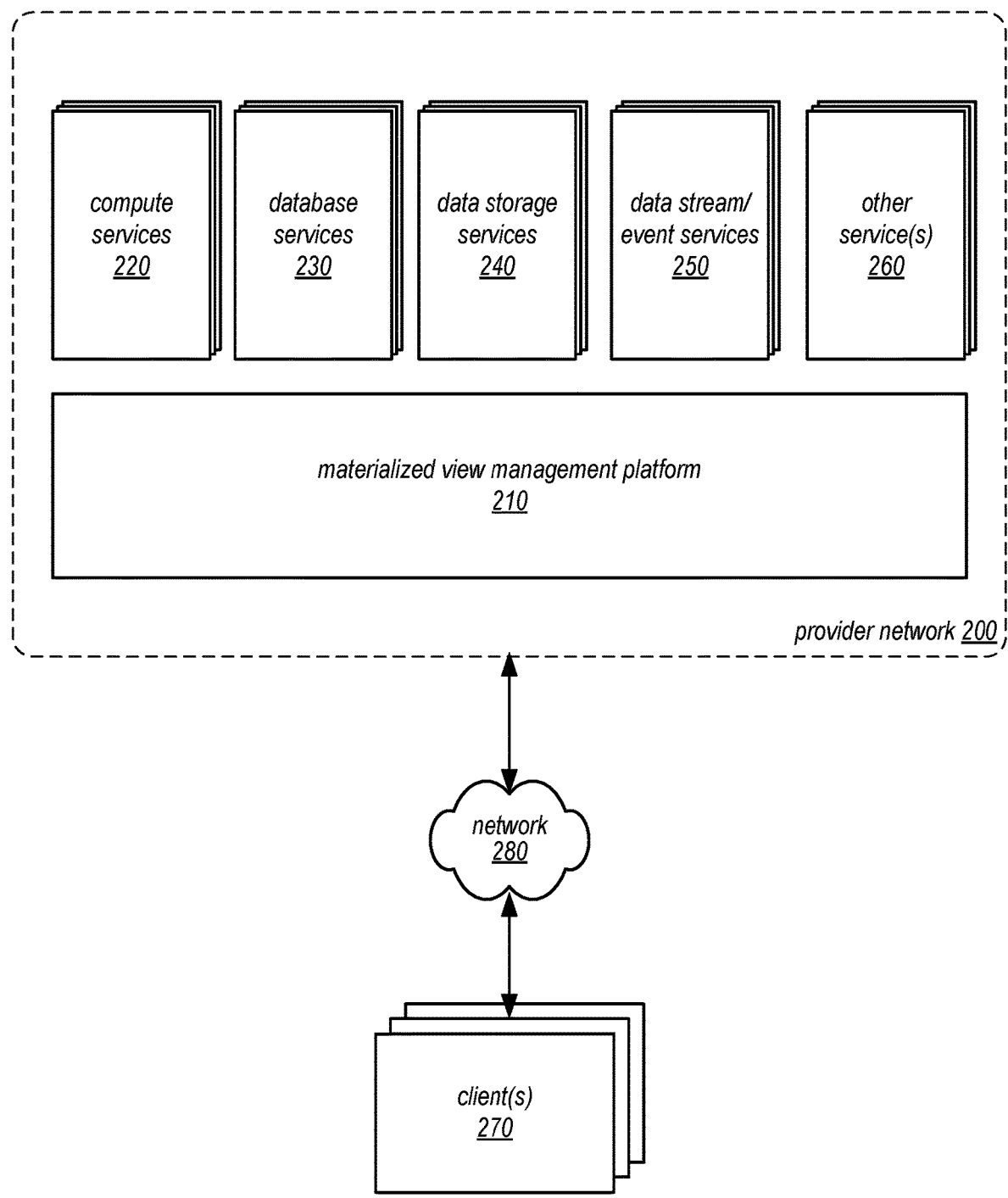
FIG. 2 is a logical block diagram illustrating a provider network offering a materialized view management platform and various services, including various data storage and processing services, according to some embodiments.

FIG. 2 is a logical block diagram illustrating a provider network offering a materialized view management platform and various services, including various data storage and processing services, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200. In some embodiments, provider network 200 may implement various computing systems, platforms, resources, or services, such as a materialized view management platform 210, compute services 220, database service(s) 230, (e.g., relational or non-relational (NoSQL) database query engines, map reduce processing, data flow processing, and/or other large scale data processing techniques), data storage service(s) 240, (e.g., an object storage service, block-based storage service, or data storage service that may store different types of data for centralized access), data stream and/or event services 250, and other services 260 (any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Compute services 210 may be implemented by provider network 200, in some embodiments. Compute services 210 may offer instances, containers, and/or functions according to various configurations for client(s) 270 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operation system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions and of provider network 200 in different embodiments, including general purpose or special purpose computer servers, storage devices, network devices and the like. In some embodiments instance client(s) 270 or other any other user may be configured (and/or authorized) to direct network traffic to a compute instance.

Compute instances, containers, and/or functions may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 270 applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic, location, etc. . . . and (in the case of reserved compute instances, containers, and/or functions) reservation term length.

In various embodiments, database services 230 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 230 may include services that process requests to data that is not stored in fully structured storage (e.g., non-relational or NoSQL databases). Database services 230 may access the data that is semi-structured or not-structured in storage, such as data objects of unstructured or semi-structured data in a separate data storage service, in one embodiment. In other embodiments, database services 230 may locally store, managed, and access semi-structured or not-structured data.

In some embodiments, database services 220 may be various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of data storage services 240. Various other distributed processing architectures and techniques may be implemented by database services 230 (e.g., grid computing, sharding, distributed hashing, etc.). Note that in some embodiments, data processing operations may be implemented as part of data storage service(s) 230 (e.g., query engines processing requests for specified data).

Data storage service(s) 240 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on provider network 200 services and/or on-premise systems or applications).

Generally speaking, clients 270 may encompass any type of client configurable to submit network-based requests to provider network 200 via network 280, including requests for materialized view management platform 210 (e.g., a request to create a materialized view from different data sources of the other provider network services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., materialized view creation requests) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
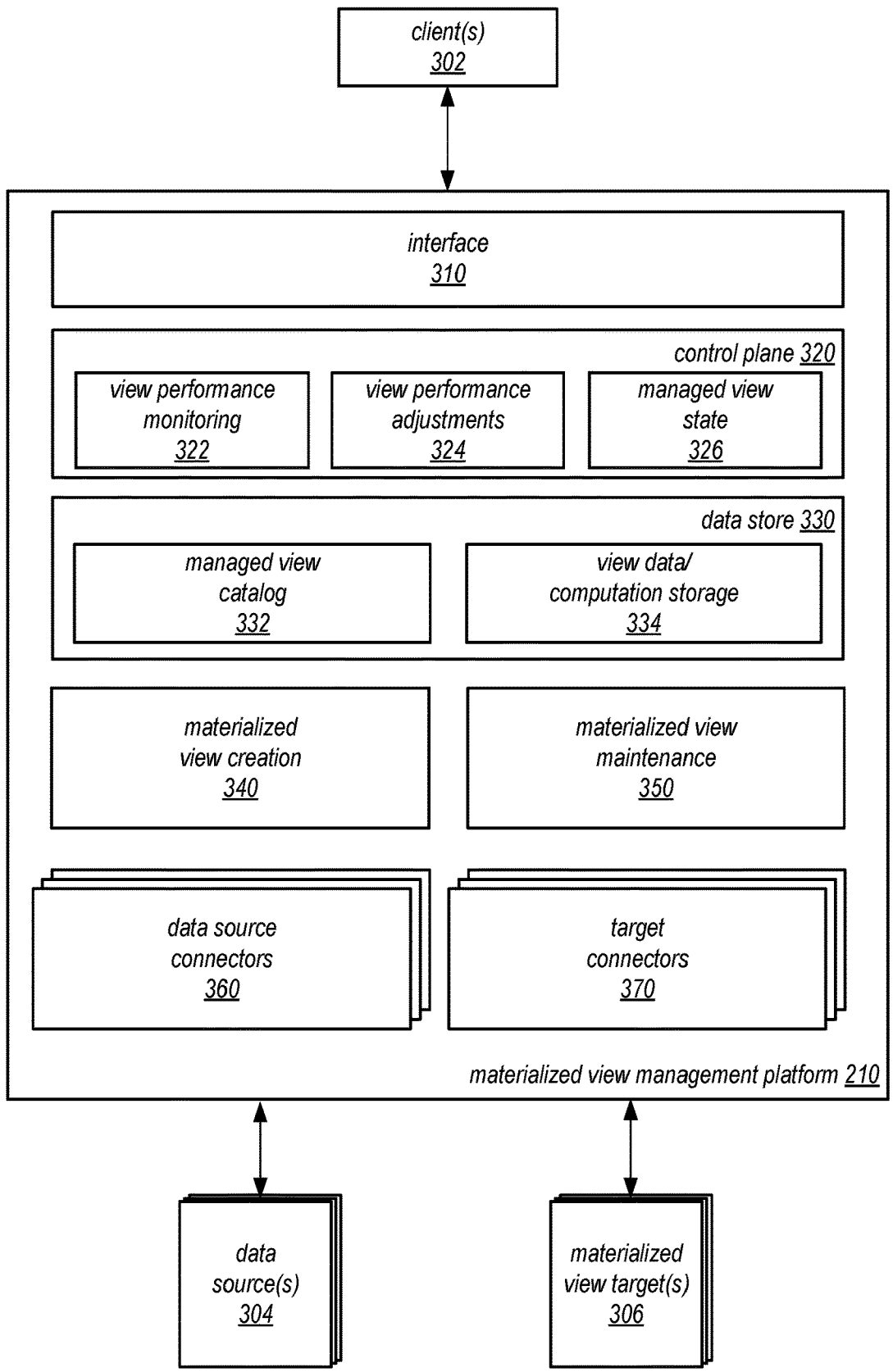
FIG. 3 is a logical block diagram illustrating a materialized view management platform that implements managed materialized views created from heterogeneous data sources, according to some embodiments.

FIG. 3 is a logical block diagram illustrating a materialized view management platform that implements managed materialized views created from heterogeneous data sources, according to some embodiments. Client(s) 302 (which may be similar to client(s) 270 in FIG. 2 above or other types of client systems, services or applications). Client(s) 302 may access materialized view management platform 210 via interface 310. Interface 310 may be a graphical user interface (e.g., implemented as a console or other graphical control view a website). Interface 310 may be implemented as a command line interface, in some embodiments. Interface 310 may be implemented as one or multiple programmatic interfaces, (e.g., one or more APIs). As discussed with regard to FIGS. 4-8, various types of requests may be received and/or responses sent via interface 310.

Materialized view management platform 210 may implement control plane 320. Control plane 320 may implement various features for managing the resources and operations for creating and maintaining materialized views. For example, control plane 320 may implement various access control mechanisms or authentication techniques to ensure that requests to create materialized views are made with appropriate authorization (e.g., to create or delete a materialized view). Control plane 320 may implement various health or other system monitoring features to ensure that various features or components of materialized view management platform are functioning correctly, repaired, or replaced. For example, control plane 320 may monitor a number nodes or instances used to implement view creation processing nodes 530 in FIG. 5 and view maintenance processing nodes 620 in FIG. 6), such as may be collected in pools or groups of instances, and replace, increase, or decrease the number of nodes or instances in order to meet demand or handle failures.

As indicated in FIG. 3, control plane 320 may implement view performance monitoring 322 in order to monitor the performance of creating and maintaining a materialized view, in some embodiments. For example, view performance monitoring 322 may collect or request performance metrics for change data capture, view computation, and view materialization to send the results to target data stores, and determine whether or not performance criteria for the view has been met. For example, performance criteria may include a lag time or other indicator for the time between when a change occurs at a source and when the change is included in an update made to a target. If the lag time exceeds a threshold amount of time (e.g., 10 minutes), then an adjustment event to reduce the lag time may be triggered. Other performance criteria may include the amount of data that is being received as a change (e.g., how many records, items or objects, or the size of data, such as 5 megabytes). Performance criteria may include criteria specified for the materialized view by a user, owner, developer, or operator via view interface 310. IN some embodiments, the specified requirements may include limitations or other restrictions on the utilization of some resources (e.g., a limit on the amount of read or write load placed on a data source or target).

Control plane 320 may implement view performance adjustments 324 to dynamically scale the resources associated with creating and maintaining a materialized view. In this way, a serverless experience can be provided, as the provisioning, management, allocation of resources may be handled by materialized view management platform 210 (instead of by a user that is manually specifying the amount resources to implement for a materialized view. View performance adjustments 324 may determine responsive actions to adjust materialized view creation and performance according to view performance monitoring 322 (e.g., according to the number and/or type of events detected). For example, view performance adjustments 324 may increase (or decrease) the number of nodes assigned to view maintenance processing in order to keep pace with an increased number of changes received from data sources.

In various embodiments, control plane 320 may maintain, update, and/or access managed view state 326. Managed view state 326 may indicate the state of various materialized views as the progress between creation and maintenance phases, as discussed below with regard to FIG. 4, as well as other state information that informs operations or workflows performed on behalf of a materialized view. For example, managed view state may indicate in state information for a materialized view that the target for that the last maintenance operation to update a materialized view occurred 10 minutes ago and that another check for updates should be performed. Managed view state 326 may identify and/or provide information for various features of materialized view creation 340 and materialized view maintenance 350, as discussed detail below with regard to FIGS. 4-7.

In various embodiments, data store 330 may be implemented as part of materialized view management platform 210. For example, materialized view management platform 332 may implement a managed view catalog 332. Managed view catalog 332 may store information related to materialized views, including a name, definition, access controls or configuration, maintenance and/or other historical information to indicate the progress or performance of a materialized view (e.g., last time updated). In some embodiments, data store 330 may provide view data and computation storage 334. For example, various intermediate tables or data, including a final internal version may be generated and stored at 334. In some embodiments, storage 334 may provide a storage space for perform maintenance operations (e.g., storing data for performing joins or other information).

Materialized view management platform 210 may implement data source connectors 360, in various embodiments. As discussed in detail below with regard to FIG. 5, data source connectors 360 may communicate with and obtain changes from data source(s) 304. In some embodiments, a data source connector 360 may facilitate a change capture protocol or interface for a particular type of data store (e.g., a My SQL connector, a data stream connector, an object store connector) for a corresponding one of data source(s) 304. As discussed above data source(s) 304 can be various services (or resources hosted within services) of provider network 200.

In various embodiments, materialized view management platform 210 may implement target connector(s) 370. Target connector(s) 370 may connect to and interact with a target for a materialized view, as discussed in detail below with regard to FIG. 7. Similar to a data source connector 360, a target connector 370 can be respectively implemented for different types of targets (e.g., a target connector for a data warehouse or a target connector for a NoSQL database). As discussed above materialized view target(s) 306 can be various services (or resources hosted within services) of provider network 200. In some embodiments data source(s) 304 and/or materialized view target(s) 306 can be implemented partially or completely external to provider network 200 (e.g., at an on-premise network or at another provider service network). In some embodiments, materialized view management platform 210 may allow for custom or user-implemented target or source connectors to be provided (e.g., uploaded via an interface and deployed for a requested materialized view) to customize the change data capture or materialized view export (e.g., from on-premise or custom data sources or targets).

Figure 4:
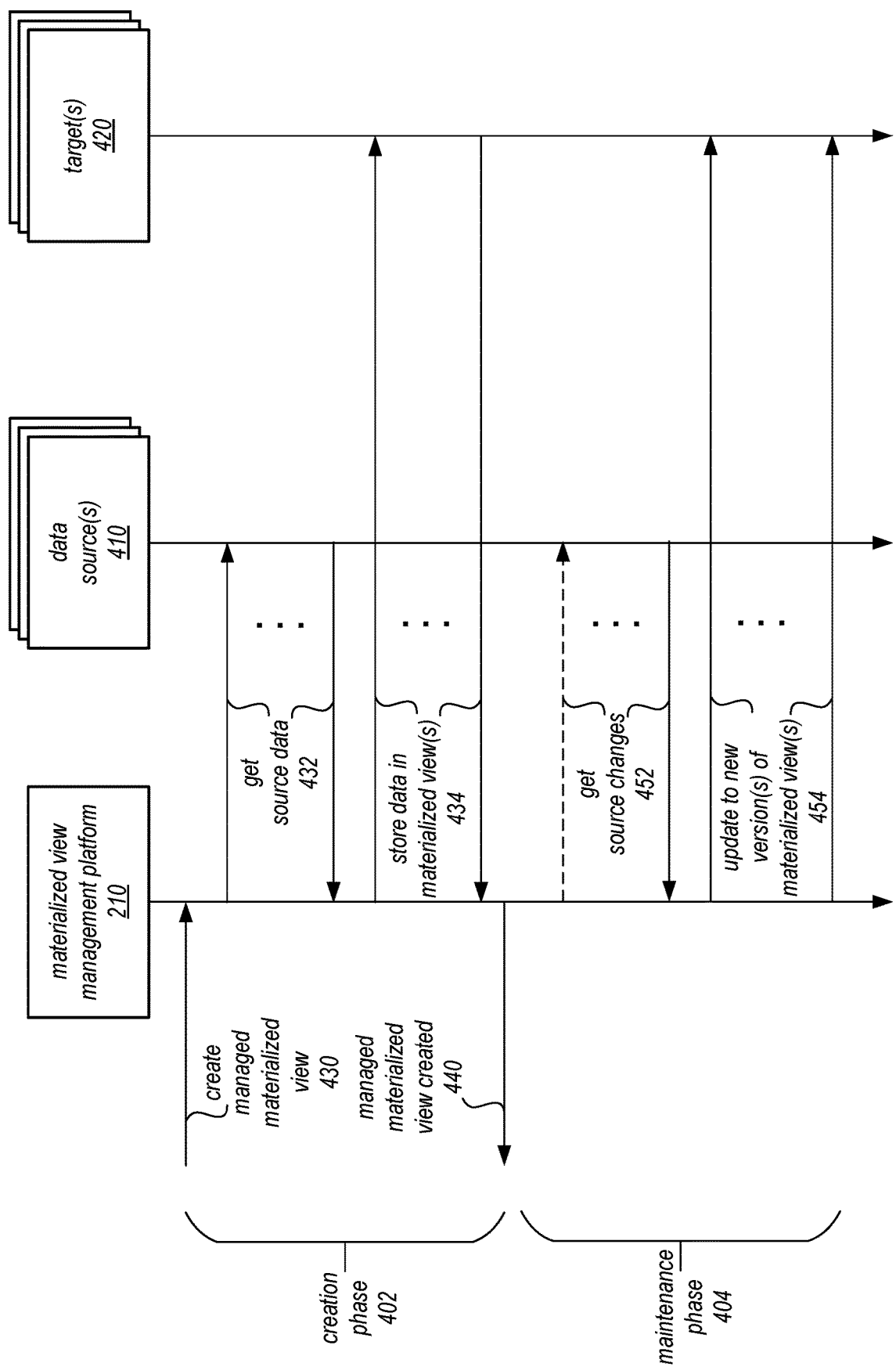
FIG. 4 is a sequence diagram illustrating interactions for creation and maintenance phases for a materialized view managed by a materialized view management platform, according to some embodiments.

Materialized view management platform 210 may operate in different phases for a materialized view. FIG. 4 is a sequence diagram illustrating interactions for creation and maintenance phases for a materialized view managed by a materialized view management platform, according to some embodiments. For example, creation phase 402 may begin with a request to create a materialized view 430 received at materialized view 210 (e.g., via interface 310). The creation request 430 may include or specify the data source(s), data target(s), and result definition that the materialized view is to provide, in some embodiments. In some embodiments, the creation request may provide the access credentials (e.g., user id, password, etc.) or other permissions to allow the creation of the materialized view and update of the materialized view in the target. In some embodiments, an identity and access management service may coordinate authentication of materialized view management platform and other services for creation and maintenance of a materialized view.

In some embodiments, a graphical interface may provide options of selectable data sources, operations to perform to determine a result from the selectable data sources, and selectable targets to which materialized view management platform 210 is capable of accessing. Once the various materialized view definition parameters are selected, a create user interface element may be selected, which triggers the "create managed materialized view request 430" (using the selected parameters and result definition). Alternatively an API may utilized, allowing for a query language or other notation (e.g., JSON, ION, etc.) to specify the data source(s), target(s), and result definition. Similar parameters or inputs can be provided by a command via a command line interface.

Figure 5:
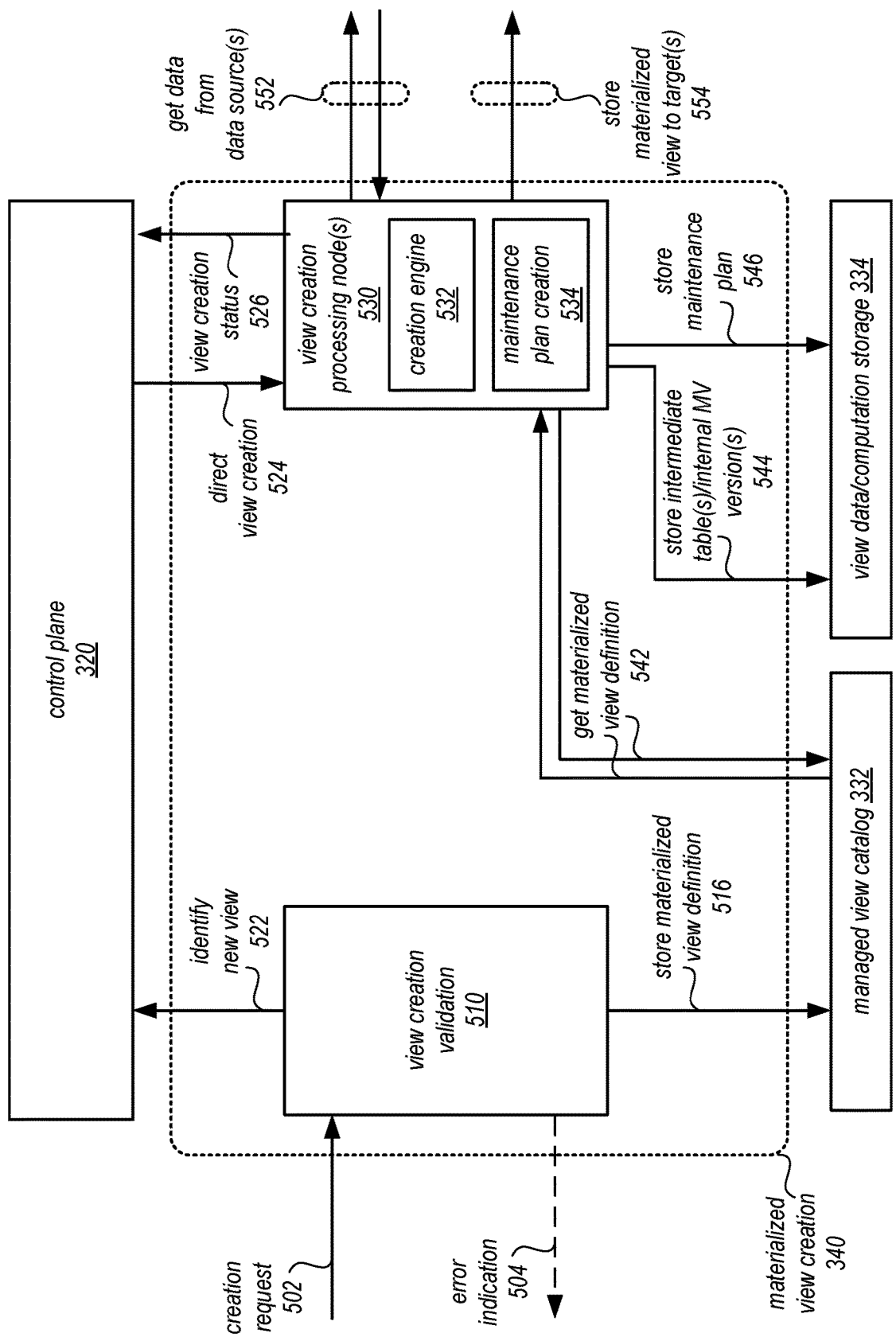
FIG. 5 is a logical block diagram illustrating materialized view creation, according to some embodiments.
Figure 11:
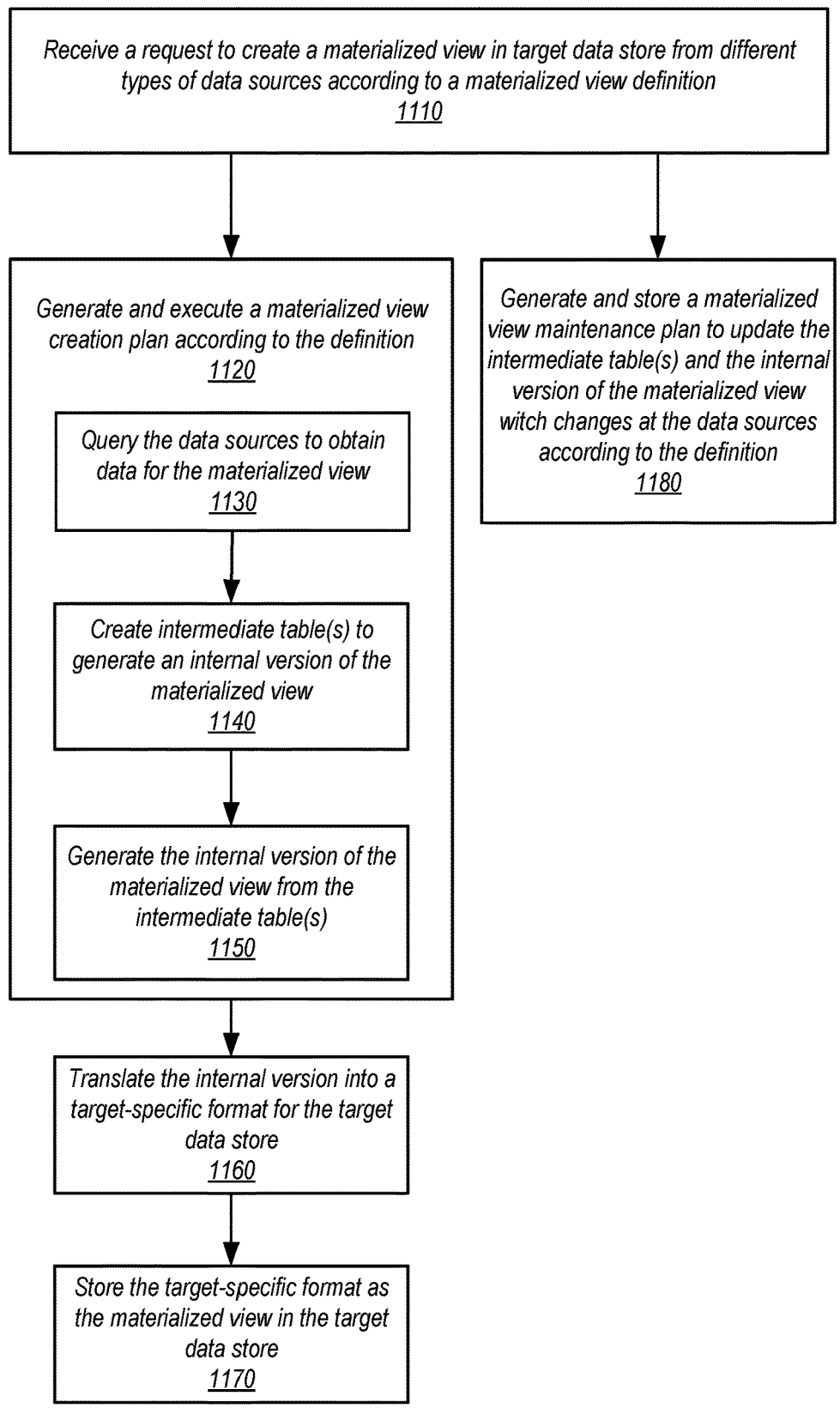
FIG. 11 is a high-level flowchart illustrating various methods and techniques to create a managed materialized view from heterogeneous data sources, according to some embodiments.

Materialized view management platform 210 may receive the request 430 and invoke the various features of a view creation process or workflow, as discussed in more detail below with regard to FIGS. 5 and 11. For example, materialized view management platform 210 may send one or more requests 432 to get source data from the data source(s) 410. These source requests may be formatted according to the language, protocol and/or interface implemented by the respective data sources. In some embodiments, a data source may push the data (e.g., a stream of data) to materialized view management platform 210. Alternatively, some data sources may allow for materialized view management platform 210 to query or send requests to access the desired data for the materialized view (e.g., according to a result set definition for the materialized view). Materialized view management platform 210 perform one or multiple requests to store the materialized view(s) 434 in the data target(s) 420, in various embodiments. For example, materialize view management platform 210 may access (or create) a table that for the materialized view to insert records for the materialized view as rows in the table.

The requests to get source data 432 and store data 434 may continue until the materialized view is created. Then, the materialized view may begin maintenance phase 404. Maintenance phase 404 may allow for materialized view management platform 210 to get 452 or otherwise respond to changes to the data sources (e.g., additional data, removed data, modified data, etc.) in order to compute or otherwise determine an update to a materialized view. For example, if a materialized view provides an aggregation function (e.g., summary, average, count, deviation, etc.) then materialized view management platform 210 may add, divided, subtract, union, join, or other perform various other operations to determine updated values corresponding to the obtained changes. Materialized view management platform 210 may then perform one or more requests to update the new version(s) of the materialized view(s) 454 to include those changes at target(s) 420.

As discussed above with regard to FIG. 3, materialized view management platform may implement materialized view creation 340 to handle operations or workflows to create a first instance of a materialized view (which can be subsequently updated). FIG. 5 is a logical block diagram illustrating materialized view creation, according to some embodiments. Materialized view creation validation 340 may implement view creation validation 510, in various embodiments. When a creation request, like creation request 502 is received, creation job validation 510 may apply one (or multiple validation) rules to determine whether various features of the materialized view to be created and maintained are valid. For example, view creation validation 510 may validate the existence of and names/identifiers for specified data sources and targets (e.g., according to verification requests to the sources/targets, or from internal metadata maintained for potential sources/targets). View creation validation 510 may validate the syntax or features specified in a result set definition for the materialized view (e.g., what types of joins, inserts, Boolean expressions, merges, updates, etc.) are allowed/supported. An error indication 504 may be provided for invalid creation requests, in some embodiments (e.g., specifying the type of validation error). View creation validation 510 may store the materialized view definition 516 for subsequent access in managed view catalog 332, in some embodiments. View creation validation 510 may also provide an indication to identify a new view 522 to be created to control plane 320, in some embodiments.

In various embodiments, control plane 320 may perform one or more requests 524 to direct view creation. For example, control plane 320 may dispatch an instruction to begin a materialize view creation to one or more view creation processing nodes 530 which may be provisioned from a fleet or pool of available view creation processing nodes to be dedicated to the creation of the materialized view. View creation processing node(s) 530 may get the materialized view definition 542 from managed view catalog 332. View creation processing node(s) 530 may implement a creation engine 532 to generate a result set according to the definition of a materialized view from the data sources. For example, creation engine 532 may be a query processor that can process large volumes data from multiple sources, push computation (e.g. joins and aggregations) to sources that can perform such computations efficiently, work over multiple schemas (or not impose a schema requirement) on the sources (e.g., structured, semi-structured, not-structured. In some embodiments, a creation engine may include a rewriting processor prior to a query processor that can rewrite the defining query of the result set for the materialized view definition into subqueries that will be delegated to the sources. In some embodiments, view creation processing nodes may then a source query and fetch back its result. In other embodiments, a source connector (discussed below with regard to FIG. 6) may perform the source queries. In some embodiments, creation engine 532 can deduce from the functions of the query and from the explicit casts that are user provided, the minimum necessary schema needed for the operation of creation engine over schemaless sources (e.g., semi-structured or not-structured sources). For additional ease-of-use, some attributes or portions of data for a materialized view that are just "passing through" materialized view management platform (e.g., without alteration or operation), such as without being arguments of predicates and functions, may be encoded in a schemaless format, like ION. The results of the materialized view creation engine 532 may be stored 554 to a materialized view in the specified targets 554.

As discussed in detail below, in some instances, view creation processing nodes(s) 530 may create and store intermediate tables and/or an internal materialized view version (as indicated at 544) in intermediate data storage 334. In some embodiments, view creation processing nodes(s) 530 may implement maintenance plan creation 534. Maintenance plan creation 534 may generate a plan (e.g., a query plan) to perform maintenance on a materialized view when a change is received (e.g., when updates to a table are made, when new items in a stream are received, etc.). For instance, maintenance plan creation 534 may also be a federated query engine or other type of query processor that can determine what queries or operations are needed to obtain a result set from the sources as specified in the materialized view when a change to one or more of the data sources is obtained. Maintenance plan creation 534 may store the maintenance plan, as indicated at 546, for subsequent use, to save computation time when performing updates to maintain a materialized view (e.g., as updates may occur frequently and be made in near continuous fashion to provide a materialized view at a target that is updated in near real-time).

View creation processing nodes(s) 530 may report view creation status 526 to control plane 320. In some embodiments, performance information or other provided information may allow control plane 320 to make adjustments in resources (e.g., increase or decrease view creation processing nodes).

Figure 6:
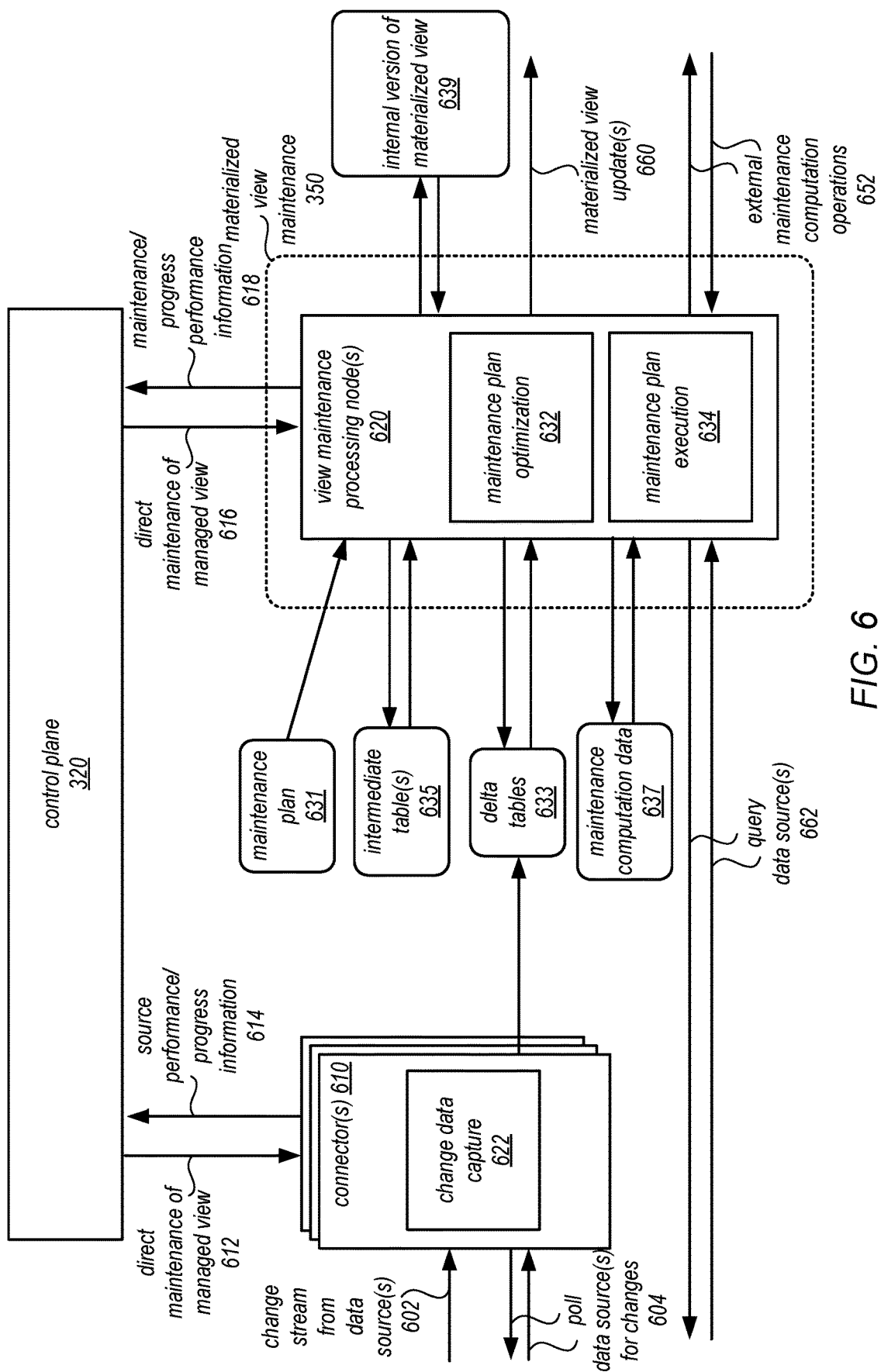
FIG. 6 is a logical block diagram illustrating materialized view maintenance, according to some embodiments.

Once materialized view creation is complete, control plane 320 may begin the maintenance phase of the materialized view. The maintenance phase may provide near real-time updates for a materialized view, by continuously updating the materialized view when changes are obtained, in some embodiments. Although some lag between a source and materialized view can occur, various techniques to adjust the performance of components of the materialized view maintenance 350 may be performed to decrease lag. FIG. 6 is a logical block diagram illustrating materialized view maintenance, according to some embodiments.

Control plane 320 may dispatch or otherwise direct maintenance of a managed view 612. For example, control plane 320 may assign 612 one or more connectors 612 to begin obtaining changes from corresponding sources for a materialized view. Connectors 610 may be a separate fleet of nodes or resources that implement protocols, interfaces, or other support for interacting or communication with data sources. Alternatively, in some embodiments, view maintenance processing nodes 620 may implement some or all of the features of connector(s) 610.

Connector(s) 622 may implement change data capture feature 622 to support obtaining changes from a data source. For example, change data capture 622 may enable a changed data capture stream supported by a source database, and register as a recipient, authorized reader, or other component capable of obtaining updates to that source as a change stream 602. In some embodiments, the data source may be a data stream, and thus the connector 610 may register or request to be a recipient of the data stream. In some embodiments, change data capture may poll for source changes, as indicated at 604. For example, connector(s) 610 may record or maintain the state of previously received changes from a source (e.g., by timestamp, version identifier, etc.) and use the state to request changes that occurred since the last received state. The changes may be directly sent to view maintenance processing nodes 620, in some embodiments. In some embodiments, the captured changes may be written to a delta table 633 that corresponds to a data source.

Connectors 610 may report source progress or performance information, as indicated at 614, to control plane 320. In this way, control plane 320 can make performance determinations to adjust the performance of connectors, in some embodiments.

Control plane 320 may direct the maintenance of a managed view, as indicated at 616, to one or more view maintenance processing nodes 620. For example, a maintenance task may be assigned to view maintenance processing nodes that cause view maintenance processing node(s) 620 to obtain the maintenance plan 631 (or alternatively view maintenance processing node(s) 620 may generate a view maintenance processing plan). View maintenance processing node(s) 620 may receive indications of new updates or may periodically poll data, such as delta table(s) 633, to determine when changes have been received. In some embodiments, view maintenance processing node(s) 620 may perform maintenance according to maintenance events or refresh rates that cause materialized view processing node(s) 620 to check for additional changes from delta tables. Alternatively, receiving new changes from connectors 610 can be a maintenance event that triggers performance of a maintenance plan to update a materialized view.

In some embodiments, view maintenance processing node(s) 620 may generate a maintenance plan 631 for updating a created materialized view or may obtained a previously created maintenance plan. A maintenance plan may describe the various operations for combining changes to various ones of the data sources to provide an updated view without regenerating the entire materialized view (e.g., by re-querying all sources to obtain all of the materialized view information). In some embodiments, view maintenance processing nodes 620 may implement maintenance plan optimization 632 to rewrite or utilize various features, such as intermediate results stored in intermediate tables 635 and/or utilization local computational capabilities and storage, such as maintenance computation data 637 (instead of using source computational storage and/or capabilities). In this way, view maintenance processing nodes 620 can adapt to the capabilities of the data sources (e.g., supported or unsupported processing operations, such as supporting or not supporting joins, aggregations, etc.) or limitations on the data sources (e.g., read or write limitations on the data sources).

View maintenance processing nodes 620 may implement maintenance plan execution 634. In some embodiments, view maintenance plan execution may be a query engine or processor that can perform the maintenance plan to obtain the changed data (as well as other data needed to make the update). If, for instance, a change is to a value that is joined with other data sources, then even if the other data sources are unchanged, the change may still need to be joined with the data from the unchanged sources, so a query (as indicated at 662) may be performed to obtain that unchanged data from the data sources (or in the event it is stored as part of maintenance computation 637, the local copy can be utilized). In some embodiments, an internal version of the materialized view may be generated which can be used to identify or indicate the changes to be made to the materialized view, as indicated at 639, or in some embodiments, the materialized view updates may be streamed or sent, as indicated at 660 for export to the target.

In some embodiments, view maintenance processing node(s) 620 may rely upon external computation resources (e.g., compute function resource as discussed above with regard to FIG. 2 of compute services 220), which may perform an operation or determine a value used as part of updating a materialized view. Similarly, some data or query operations can be performed by data source resources, and thus queries, such as query 662, may be performed as part of determining updates to a materialized view.

View maintenance processing nodes 620 may report progress and performance information 618 to control plane 320. In this way, control plane 320 can evaluate the performance of operations to determine updates and make adjustments to scale the resources allocated to maintaining the materialized view to satisfy performance criteria. For example, directing the maintenance of managed view 616 may include operations to add or remove the number view maintenance processing nodes 620, or modify the criteria or parameters for performing features like maintenance plan optimization 632 (e.g., assigning local or remote operations to optimize for speed, which may incur greater cost, or to optimize for cost, which may incur slower speeds).

Figure 7:
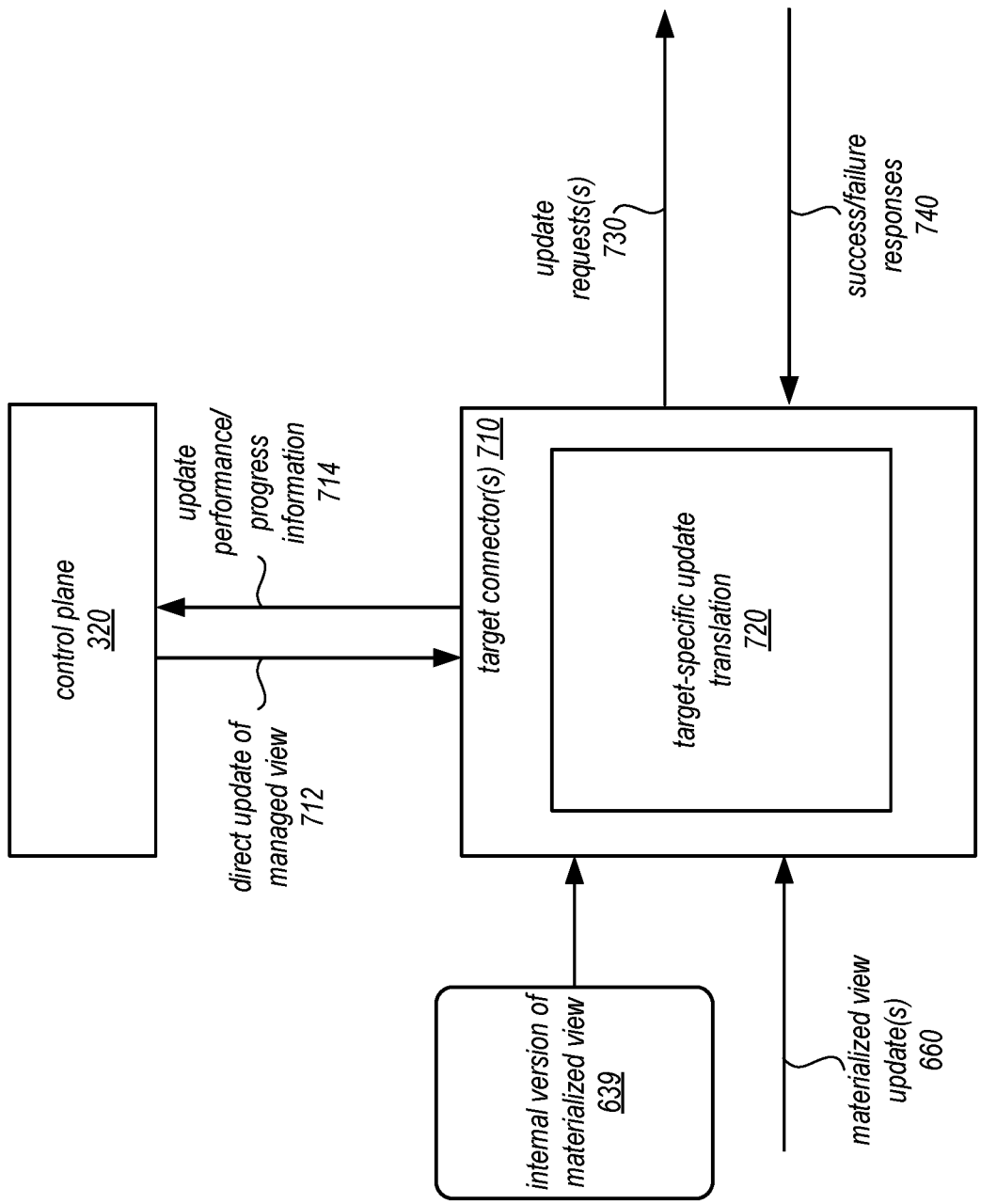
FIG. 7 is a logical block diagram illustrating performance of updates to a target data store for a materialized view, according to some embodiments.

Once changes to a materialized view have been computed from the changes of a data source, then changes to the materialized view may be materialized by materialized view management platform 210. FIG. 7 is a logical block diagram illustrating performance of updates to a target data store for a materialized view, according to some embodiments. As noted in FIG. 3, target connector(s) 710 may be implemented to interact with a target for a materialized view. Target connector(s) 710 may be assigned, dispatched or otherwise directed by control plane 320, as indicated at 712. For example, target connector(s) 710 may be a separate fleet of nodes or resources that implement protocols, interfaces, or other support for interacting or communication with targets. Alternatively, in some embodiments, view maintenance processing nodes 620 may implement some or all of the features of target(s) 710.

Target connector(s) 710 may obtain the changes to be made to a materialized view, in various embodiments. For example, materialized view update(s) 660 may be sent as computed by a virtual maintenance processing node 620. In some embodiments, internal version of materialized view 639 may be read to identify the new or changed portions of the materialized view to update at targets. In some embodiments, the updates to a materialized view may be grouped or associated with a snapshot in order to indicate what version of a materialized view should include what changes. When performing updates, such as update requests 730, target connector(s) 710 may record the progress of making the updates for a particular snapshot (e.g., by submitting checkpoint indications or other progress markers). For instance, a target connector 710 may wait to receive a success acknowledgement 740 for an update request 730 before advancing the progress information (e.g., advancing the checkpoint). If instead a failure response 740 is received, then target connector 710 may retry the update request 730.

In various embodiments, target connector(s) 710 may implement target-specified update translation 720. For example, target-specific update translation may perform data type conversions, operation conversions, and/or generate the request parameters needed to perform an update request 730 to make a corresponding change in the materialized view according to the interface of the target system. In some embodiments, target connector(s) 710 may enforce ordering constraints. For example, before performing update request(s) 730, target connector(s) 710 receive the updates associated with a snapshot and perform the updates in order. In some embodiments, target connector(s) 710 may ensure that a later snapshot is not applied before an earlier snapshot. In some embodiments, target connector(s) 710 may perform deduplication to prevent duplicate updates from being performed. For example, target connector(s) 710 may track the updates successfully performed (as discussed above) in order to prevent a failure from causing an already performed update from being re-performed.

Figure 8:
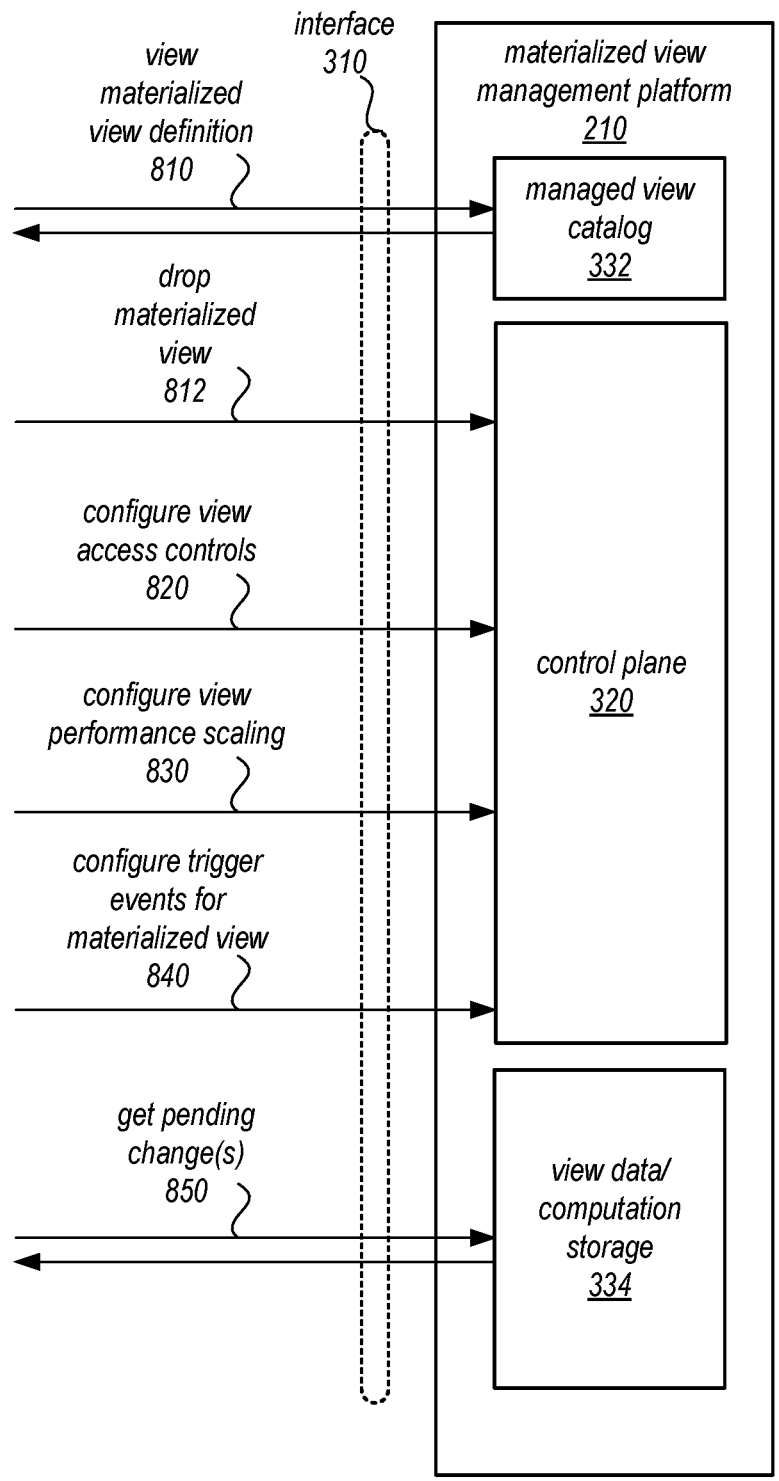
FIG. 8 is logical block diagram illustrating interactions supported by an example interface for a materialized view management platform, according to some embodiments.

Various requests or interactions with a materialized view management platform may be supported to configure creation and maintenance of materialized view and/or obtain information for materialized views. FIG. 8 is logical block diagram illustrating interactions supported by an example interface for a materialized view management platform, according to some embodiments.

As indicated at 810, a request to view a materialized view definition 810 may be received, in some embodiments. In this way, a definition can be inspected or analyzed to understand how the materialized view is achieved (e.g., if received from another system or application that is not the publishing application that requested the creation of the materialized view). As indicated at 812, a request to drop a materialized view may be received, in some embodiments, which may cause materialized view management platform 210 to stop obtaining changes, release or reassign resources for performing maintenance, delete any internal data and/or delete the materialized view at a target.

As indicated at 820, a request to configure view access controls may be received. Such requests 820 may enable or disable the access rights of different applications or systems to receive a materialized view, in some embodiments. For example, a publisher/subscriber model may be implemented for a materialized view generated by materialized view management platform 210 that may allow for a publishing entity to specify or allow which target systems receive a materialized view. The publisher can then later modify the configuration to disable or add subscribers, in some embodiments.

As indicated at 830, requests(s) to configure performance scaling 830 may be received. For example, minimum performance requirements (e.g., maximum allowed lag time, frequency of maintenance events, etc.) may be specified as a request 830, which may serve as a trigger for adjustment actions to scale the resources allocated to a materialized view by materialized view management platform 210 to be sized to satisfy the minimum performance requirements. In some embodiments, cost limitations for maintaining the materialized view and/or upper bounds upon the utilization of data sources may also be used to configure performance scaling. In some embodiments, trigger events may be configured for a materialized view, as indicated 840, such as notifications of an update or to perform further processing of data at another service (e.g., at a function computation resource), in some embodiments.

As indicated at 850, requests to get pending change(s) 850 that have not yet been stored to a materialized view in a target system, in some embodiments. For example, view data/computations storage 334 can be accessed to determine these changes (or they may be determined by a target connector, view maintenance processing node, or other component). In some embodiments, requests 850 may be distinguish between the various phases of processing, such as an example "GetPendingCommits( )" call that can return the part of the view that has not yet been committed to the target, a "GetTargetCommits ( )" call that can return the latest source transaction ids or source timestamps reflected in the external view committed to the target," and/or a "GetMVPlatformCommits ( )" that can return the latest source transaction ids or source timestamps reflected in the internal view, maintained by materialized view management platform (if any such internal version is maintained).

Figure 9:
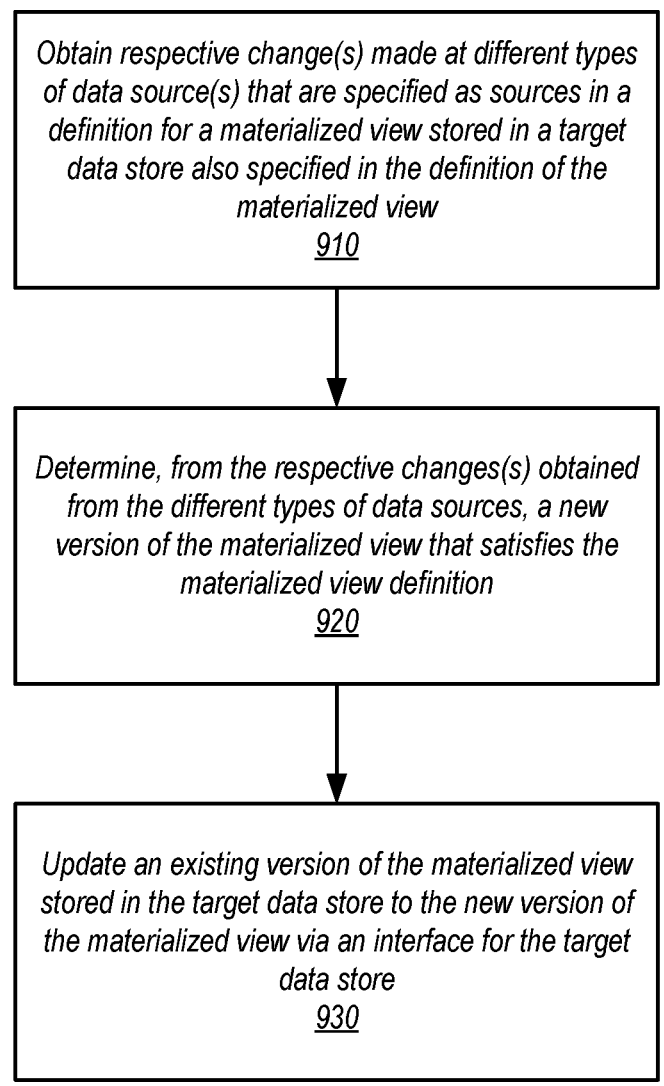
FIG. 9 is a high-level flowchart illustrating various methods and techniques to implement managed materialized views created from heterogeneous data sources, according to some embodiments.

Although FIGS. 2-8 have been described and illustrated in the context of a provider network implementing a materialized view management platform, the various components illustrated and described in FIGS. 2-8 may be easily applied to other materialized view management techniques, systems, or devices that manage the creation and management of materialized views across different sources and targets. As such, FIGS. 2-8 are not intended to be limiting as to other embodiments of a system that may implement managed query execution. FIG. 9 is a high-level flowchart illustrating various methods and techniques to implement managed materialized views created from heterogeneous data sources, according to some embodiments.

Various different systems and devices may implement the various methods and techniques described below, either singly or working together. For example, a materialized view management platform such as described above with regard to FIGS. 2-8 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 910, respective changes made at different types of data sources that are specified as sources in a definition for a materialized view stored in a target data store also specified in the definition of the materialized view may be obtained, in some embodiments. For example, as discussed above, a materialized view definition may be received that specifies a result to obtain for the materialized view. The view definition can specify one or multiple of the different data sources that a materialized view management platform, like materialized view management 110 or materialized vie management 210 discussed above or other materialized view management platform, can be capable of communicating with in order to obtain the respective changes. In some embodiments, polling techniques may be implemented to request recent changes (or changes since a last request). In some embodiments, changes may be received as part of a replication protocol or technique for the source (e.g., a change data capture stream generated by a database). In some embodiments, the data source itself may be its own changes, such as data stream source which may treat each item in the data stream as a new item and thus a change. Different techniques for obtaining data from the data sources may be implemented for the same materialized view (e.g., one data source may be polled to obtain changes while another data source for the same view may be a stream of received changes).

As indicated at 920, from the respective change(s) obtained from the different types of data sources, a new version of the materialized view that satisfies the materialized view definition may be determined. For example, a result set or other definition for the materialized view may be evaluated to determine one or more operations to perform to update the values or features of the materialized view. For example, a materialized view may provide an average value of a group of values joined to a particular record (e.g., a user id). The respective change may be to update the average when new input data that affects the average value is received as a change (although the particular record may have not changed). A maintenance plan may be created and/or executed, in some embodiments. For example, as discussed above, the different operations for combining changes into an updated materialized view may be specified and then executed when changes are received. In some embodiments, a new version may be associated with a new snapshot of the materialized view.

As indicated at 930, an existing version of the materialized view stored in the target data store may be updated to the new version of the materialized view via an interface for the target data store, in some embodiments. For example, the one or more changes may be translated into API requests that are supported by the target system and sent to the target system to be performed. In some embodiments, update tracking may be implemented in order to ensure that updates are not repeated if already made successfully to the materialized view in the target, in some embodiments. In some embodiments, the updates may be applied in streaming fashion (e.g., as determined at 920) in order to provide a real-time or near real-time experience of the materialized view at the target.

Figure 10:
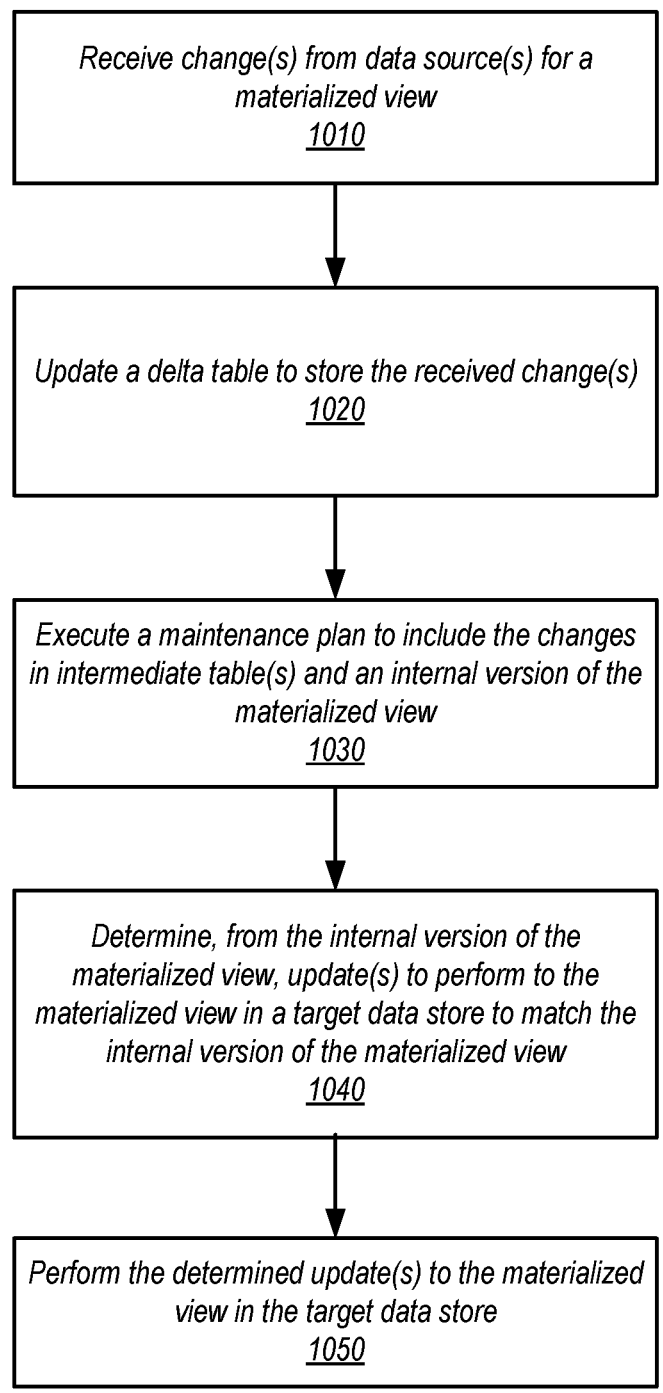
FIG. 10 is a high-level flowchart illustrating various methods and techniques to update an internal version of the materialized view used to update a materialized view in a target data store, according to some embodiments.

Various techniques for handling changes may be implemented to update a materialized view may be implemented. In some embodiments, the updates may be handled in streaming fashion where each change is evaluated and a corresponding update generated to the materialized view generated for performance at the materialized view of the target. However, in some scenarios (e.g., complex operations and analyses) intermediate data structures and an internal version of the materialized view may be used to provide updates. FIG. 10 is a high-level flowchart illustrating various methods and techniques to update an internal version of the materialized view used to update a materialized view in a target data store, according to some embodiments.

As indicated at 1010, changes may be received from a data source(s) for a materialized view, in some embodiments. For example, source connectors as discussed above with regard to FIG. 5 may receive changes at data sources. As indicated at 1020, a delta table to store the received change(s) 1020 may be updated, in some embodiments. For example, a delta table may be maintained for each data source. In other embodiments, no delta tables may be maintained, and thus in some techniques element 1020 may not be performed.

As indicated at 1030, a maintenance plan to include the changes and additional data in an internal version of the materialized view may be executed, in some embodiments. For example, the maintenance plan may describe the operations, intermediate tables or result sets, and/or internal version updates to perform. For example, different join operations with internally maintained tables or intermediate results may be performed along with a merge operation with an internal version to include changes.

As indicated at 1050, update(s) to perform to the materialized view in a target data store may be determined to match the internal version of the materialized view, according to some embodiments. For example, a scan of the internal view may be made to identify the changes to be made since a last update for a materialized view. As indicated at 1060, the determined update(s) to the materialized view in the target data store may be performed, according to some embodiments. For example, update requests sent to the target data store may cause the same updates to be performed to the materialized view in the target system.

As with performing maintenance on a materialized view, different techniques for creating the materialized view at a materialized view management platform may be performed. While some creation techniques may be able to treat the operations to perform the creation of a materialized view directly into the target system, other techniques may create various artifacts to aid in the performance of subsequent maintenance operations. FIG. 11 is a high-level flowchart illustrating various methods and techniques to create a managed materialized view from heterogeneous data sources, according to some embodiments.

As indicated at 1110, a request may be received to create a materialized view in a target data store from different types of data sources according to a materialized view definition, in some embodiments. As indicated at 1120, a materialized view creation plan may be generated and executed according to the definition. For example, a federation query engine may be able to identify and order operations to obtain the source data from the sources at different types and locations of source data and then generate a plan accordingly. In some embodiments, the creation plan may query the data sources to obtain the data for the materialized view, as indicated at 1130. In some embodiments, the plan may include the creation of intermediate table(s) to generate an internal version of the materialized view, as indicated at 1140. For example, in some embodiments, intermediate results from different subqueries or operations to combine sub-queries may be generated in order to determine a final materialized view that is an internal version of the materialized view. As indicated at 1150, the internal version of the materialized view may then be generated from the intermediate tables, in some embodiments.

As indicated at 1160, the internal version of the table may be translated into a target-specific format for the target data store, in some embodiments. For example, data type conversions, different orderings of fields, or inclusion or removal of delimiters may be performed. As indicated at 1170, the target-specific format may be stored as the materialized view in the target data store, in some embodiments.

As indicated at 1180, a maintenance plan may be created to update the intermediate table(s) and the internal version of the materialized view according to the materialized view definition, in some embodiments. As discussed above, in some embodiments, internal tables and/or an internal version of the materialized view may not be created. In such embodiments a maintenance plan may be created (although it may not in some other embodiments).

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 12:
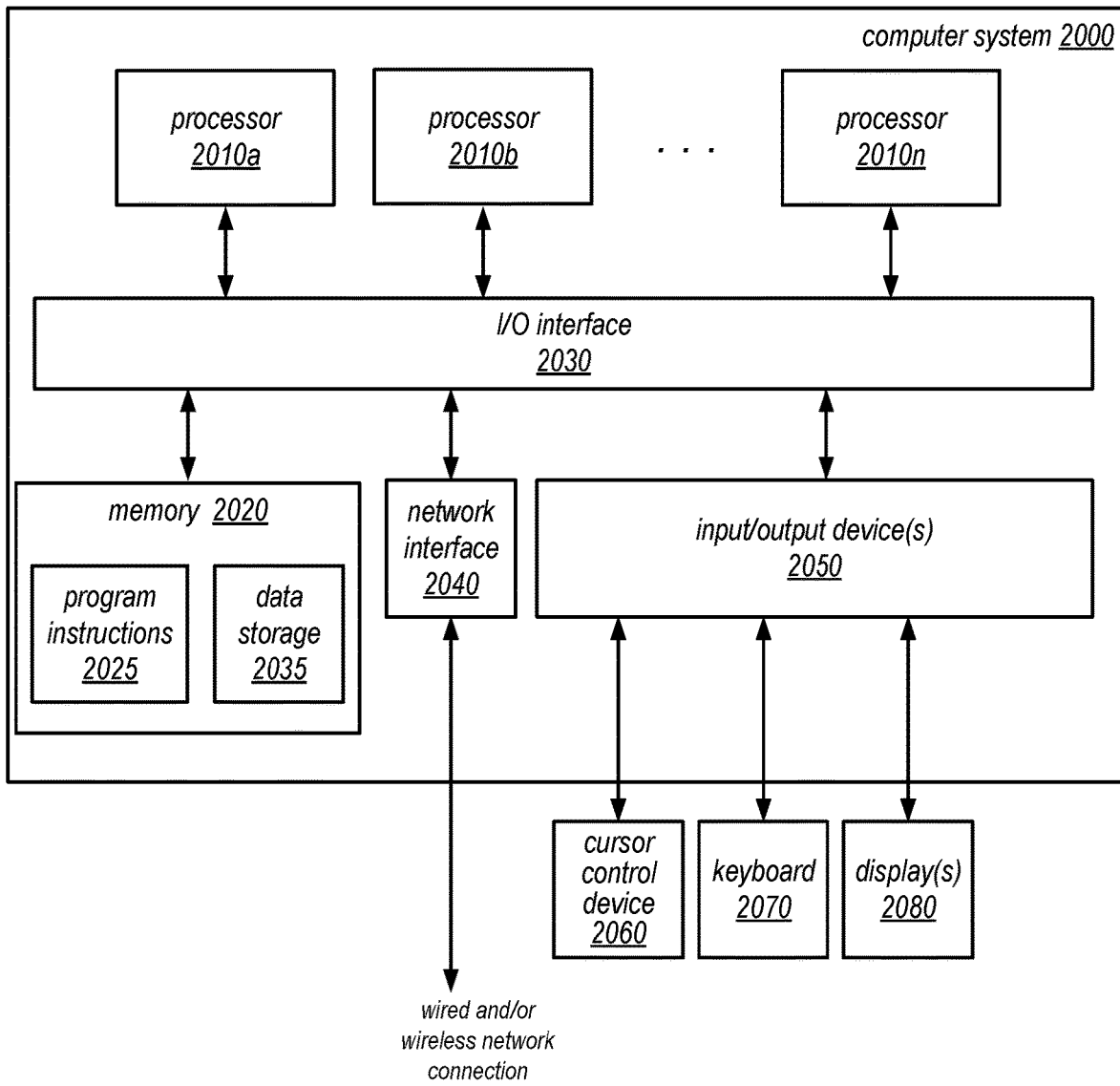
FIG. 12 illustrates an example system configured to implement the various methods, techniques, and systems described herein, according to some embodiments.

Embodiments of managed materialized views created from heterogeneous data sources as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a materialized view management platform, the materialized view management platform, configured to:
   create a materialized view from one or more data sources that are specified as sources in a definition for a materialized view, wherein the materialized view management platform is capable of creating the materialized view from a plurality of different types of data sources, and wherein the materialized view is stored by the materialized view management platform in a target data store also specified in the definition of the materialized view;
   obtain, for at least one of the the one or more data sources, a respective one or more changes made at the at least one data source;
   determine a new version of the materialized view that satisfies the definition of the materialized view from the respective one or more changes obtained from the at least one data source; and
   send one or more requests to update an existing version of the materialized view stored in the target data store to the new version of the materialized view via an interface for the target data store.

2. The system of claim 1, wherein to determine a new version of the materialized view that satisfies the definition of the materialized view from the respective one or more changes obtained from the at least one data source, the materialized view management platform is configured to generate a stream of updates to be performed to the materialized view as the changes are obtained from the one or more data sources.

3. The system of claim 1, wherein to obtain the respective one or more changes made at the at least one data source, the materialized view management platform is configured to enable a change data capture stream to be received from the at least one data source.

4. The system of claim 1, wherein the materialized view management platform is offered as part of a provider network, wherein at least one of the one or more data sources or the target is another service offered by the provider network.

5. A method, comprising:
    obtaining, by a materialized view management platform, a respective one or more changes made at one or more data sources that are specified as sources in a definition for a materialized view, wherein the materialized view management platform is capable of creating the materialized view from a plurality of different types of data sources, and wherein the materialized view is stored by the materialized view management platform in a target data store also specified in the definition of the materialized view;
    determining, by the materialized view management platform, a new version of the materialized view that satisfies the definition of the materialized view from the respective one or more changes obtained from the one or more data sources; and
    updating, by the materialized view management platform, an existing version of the materialized view stored in the target data store to the new version of the materialized view via an interface for the target data store.

6. The method of claim 5, further comprising:
    receiving a request to create the materialized view that includes the definition of the materialized view;
    in response to receiving the request:
    generating, according to the definition, a creation plan that includes instructions to:
        query the one or more of data sources to obtain data for the materialized view;
        create one or more intermediate tables to generate an internal version of the materialized view; and
        generate the internal version of the materialized view from the one or more intermediate tables.

7. The method of claim 6, further comprising:
    further in response to receiving the request to create the materialized view, generating and storing a maintenance plan for the materialized view according to the definition, wherein the maintenance plan includes operations to update the one or more intermediate tables and the internal version of the materialized view with changes received from the one or more data sources.

8. The method of claim 5, wherein determining, from the respective one or more changes obtained from the one or more data sources, the new version of the materialized view that satisfies the materialized view definition comprises executing the maintenance plan generated for the materialized view that includes the changes in intermediate tables and an internal version of the materialized view.

9. The method of claim 8, wherein updating the existing version of the materialized view stored in the target data store to the new version of the materialized view via the interface for the target data store comprises:
    determining, from the internal version of the materialized view, one or more updates to perform to the materialized view in the target data store to match the internal version of the materialized view; and
    sending one or more requests via the interface to the target data store to perform the determined one or more updates to the materialized view in the target data store.

10. The method of claim 5, wherein obtaining the respective one or more changes made at the plurality of different types of data sources comprises:
    for at least one of the different data sources, enabling a change data capture stream to be received from the at least one data source.

11. The method of claim 5, wherein obtaining the respective one or more changes made at the plurality of different types of data sources comprises:
    for at least one of the different data sources:
        sending a request to obtain those changes that occurred at the one data source after a previous request to obtain changes; and
        receiving, from the one data source the respective one or more changes that were made at the one data source.

12. The method of claim 5, wherein obtaining the respective one or more changes made at the plurality of different types of data sources comprises querying respective delta tables for the different data sources to obtain the respective on or more changes made at the plurality of different types of data sources that were stored into the respective delta tables by respective connectors for the different types of data sources.

13. The method of claim 5, wherein the target data store is one of the one or more data sources.

14. One or more non-transitory, computer-readable storage media, storing program instructions that when executed on or across one or more computing devices cause the one or more computing devices to implement a materialized view management platform that implements:
    obtaining a respective one or more changes made at one or more data sources that are specified as sources in a definition for a materialized view, wherein the materialized view management platform is capable of creating the materialized view from a plurality of different types of data sources, and wherein the materialized view is stored by the materialized view management platform in a target data store also specified in the definition of the materialized view;
    determining a new version of the materialized view that satisfies the definition of the materialized view from the respective one or more changes obtained from the one or more data sources; and
    sending one or more requests to update an existing version of the materialized view stored in the target data store to the new version of the materialized view via an interface for the target data store.

15. The one or more non-transitory, computer-readable storage media of claim 14, wherein the one or more non-transitory, computer-readable storage media store further program instructions that when executed on or across the one or more computing devices cause the materialized view management platform to further implement:

receiving a request to create the materialized view that includes the definition of the materialized view;

in response to receiving the request:

generating, according to the definition, a creation plan that includes instructions to:

query the one or more of data sources to obtain data for the materialized view.

16. The one or more non-transitory, computer-readable storage media of claim 15, wherein the one or more non-transitory, computer-readable storage media store further program instructions that when executed on or across the one or more computing devices cause the materialized view management platform to further implement:

further in response to receiving the request to create the materialized view, generating and storing a maintenance plan for the materialized view according to the definition, wherein the maintenance plan includes operations to update the one or more intermediate tables and the internal versin of the materialized view with changes received from the one or more data sources.

17. The one or more non-transitory, computer-readable storage media of claim 14, wherein, in obtaining the respective one or more changes made at the one or more data sources that are specified as sources in the definition for the materialized view, the program instructions cause the materialized view management platform to implement:

using a first technique to obtain changes from a first one of the one or more data sources; and using a first technique to obtain changes from a first one of the one or more data sources.

18. The one or more non-transitory, computer-readable storage media of claim 14, wherein, in determining, from the respective one or more changes obtained from the one or more data sources, the new version of the materialized view that satisfies the materialized view definition, the program instructions cause the materialized view management platform to implement executing the maintenance plan generated for the materialized view that includes the changes in one or more intermediate tables and an internal version of the materialized view.

19. The one or more non-transitory, computer-readable storage media of claim 14, wherein, in determining, from the respective one or more changes obtained from the one or more data sources, the new version of the materialized view that satisfies the materialized view definition, the program instructions cause the materialized view management platform to implement generating a stream of updates to be performed to the materialized view as the changes are obtained from the one or more data sources.

20. The one or more non-transitory, computer-readable storage media of claim 14, wherein the materialized view management platform is offered as part of a provider network, wherein at least one of the one or more data sources or the target is another service offered by the provider network.

* * * * *